United States Patent [19]

Inoue et al.

[11] 4,169,678
[45] Oct. 2, 1979

[54] SPECTROPHOTOMETER

[75] Inventors: Masaru Inoue, Mito; Makoto Ishikawa, Katsuta; Kenji Fukuda, Mito, all of Japan

[73] Assignee: Hitachi, Ltd., Japan

[21] Appl. No.: 865,487

[22] Filed: Dec. 29, 1977

[30] Foreign Application Priority Data

Jan. 7, 1977 [JP] Japan .................................. 52-386

[51] Int. Cl.$^2$ .............................................. G01J 3/42
[52] U.S. Cl. .................................................. 356/321
[58] Field of Search ... 356/89, 93, 95, 321 (U.S. only)

[56] References Cited

U.S. PATENT DOCUMENTS

| 2,984,149 | 5/1961 | Herscher et al. | 356/89 |
| 3,409,372 | 11/1968 | Ricken | 356/89 |
| 3,790,283 | 2/1974 | Way et al. | 356/89 X |

FOREIGN PATENT DOCUMENTS 909445 10/1962 United Kingdom ..................... 356/89

OTHER PUBLICATIONS

Catalog entitled "Model 283 and Model 281 Infrared Spectrophotometers", published by Perkin Elmer Company in 1975.
"Handbook of Optical Techniques", pp. 1014–1020, edited by Hiroshi Kubota, et al., published Jul. 10, 1969.

*Primary Examiner*—F. L. Evans
*Attorney, Agent, or Firm*—Craig and Antonelli

[57] ABSTRACT

A spectrophotometer used for measurement of the transmittance of a sample according to an optical null method, wherein light from a light source is divided into two light beams and pass through a sample cell and reference cell respectively, chopped by a chopper for alternatively supplying the light beams through a monochrometer to a light detector providing signals which are amplified and subjected to synchronous detection by a synchronous rectifier operating in synchronism with the chopper operation so as to obtain an electric signal proportional to the intensity difference between the light passed through the sample cell and that passed through the reference cell with the intensity of the light passed through the reference cell being controlled by a light attenuator connected to a recording pen until the difference signal becomes null. The spectrophotometer further includes an AC signal source generating an AC signal in synchronous relation with the operation of the chopper for applying the AC signal to the input of the amplifier, a position-voltage transducer providing a signal representing the position of a recording pen, a voltage difference detector detecting the difference between the output voltages of the position-voltage transducer before and after the application of the AC signal, and a voltage variation rate detector detecting rate of transient variation with respect to time of the signal of the position-voltage transducer after application of the AC signal. The optical sensitivity of the spectrophotometer is detected by the voltage difference detector and the electrical gain is detected by the voltage variation rate detector.

7 Claims, 21 Drawing Figures

FIG. 4
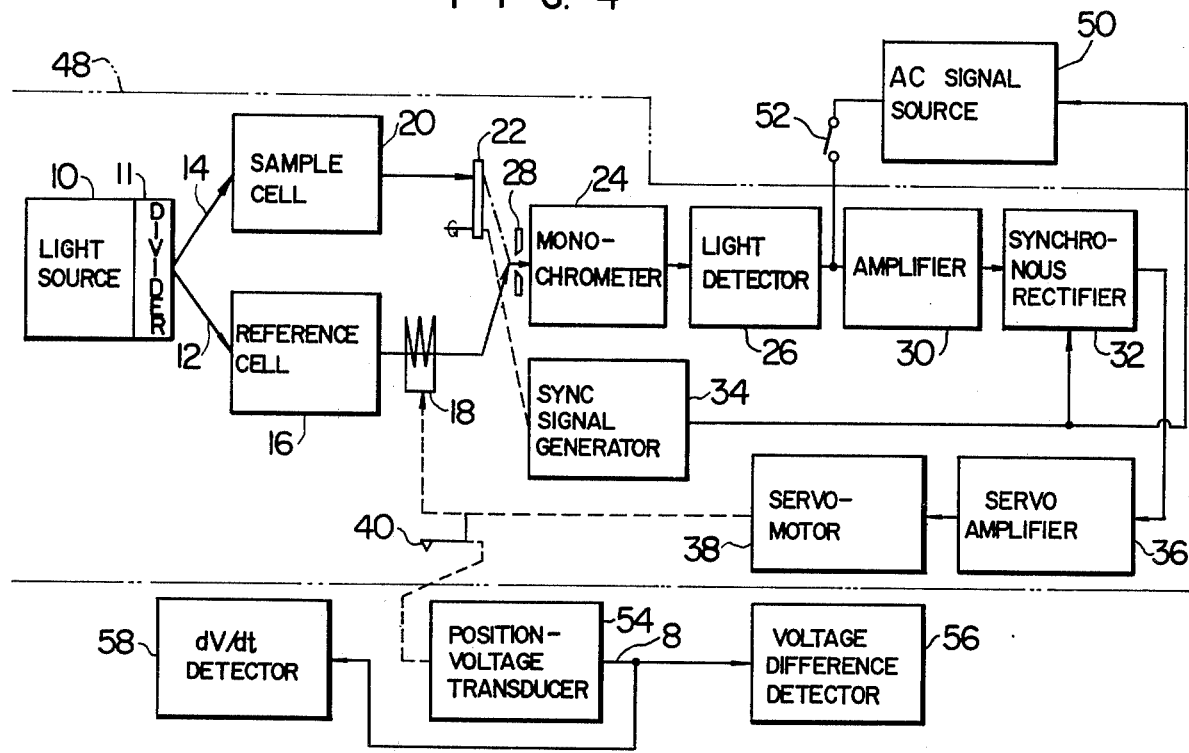
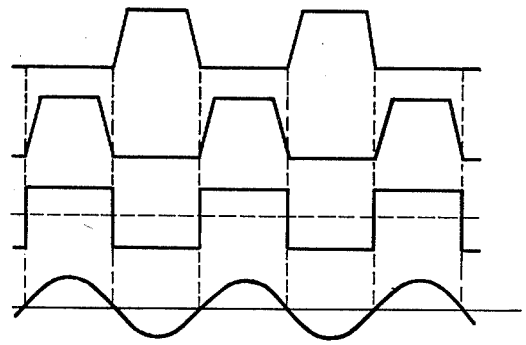
FIG. 5A
FIG. 5B
FIG. 5C
FIG. 5D
FIG. 6A  FIG. 6B  FIG. 6C
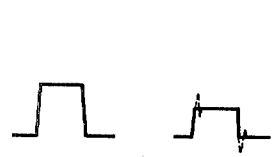
FIG. 6D  FIG. 6E
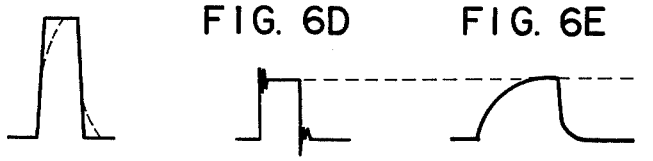

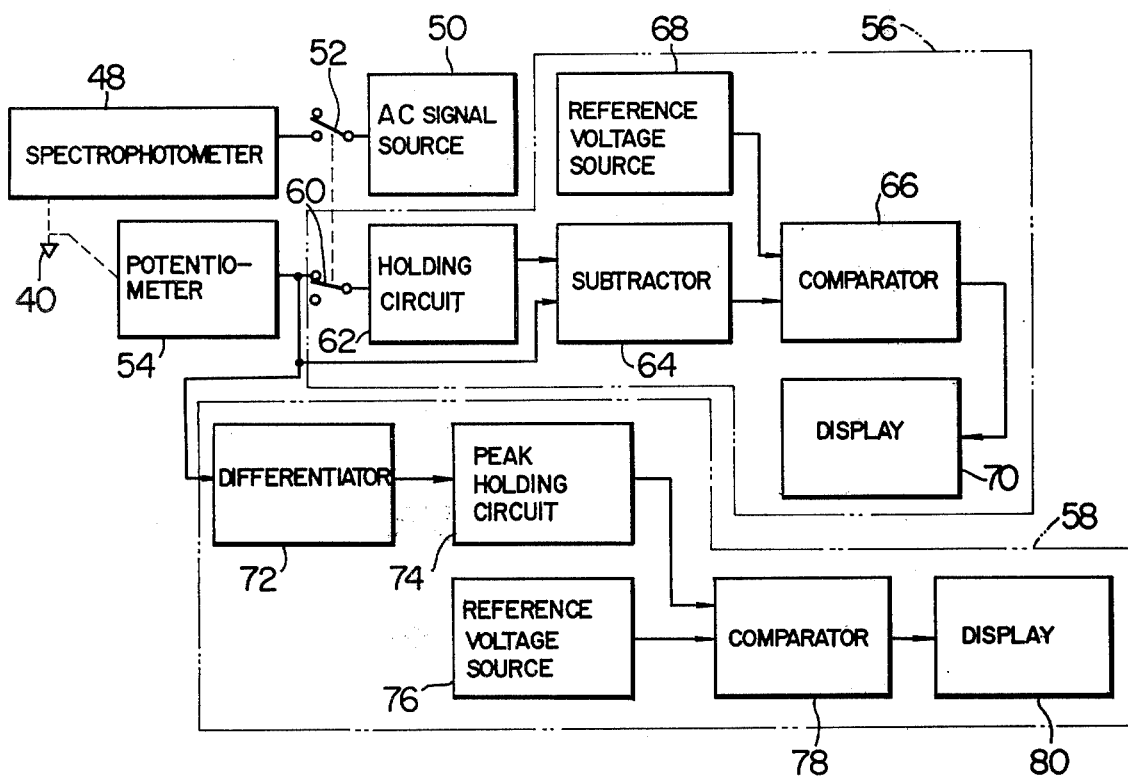
F I G. 7
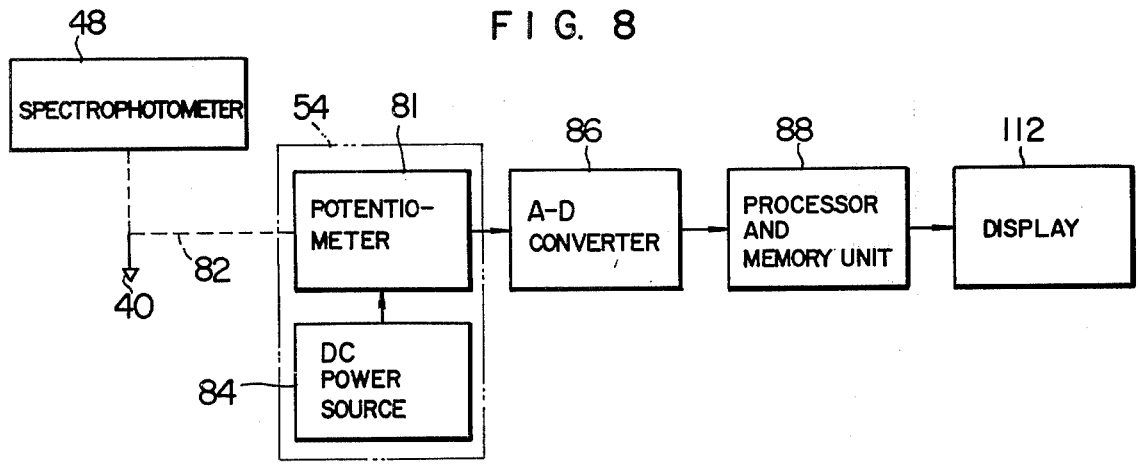
F I G. 8
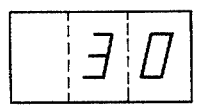
F I G. 10A
F I G. 10B
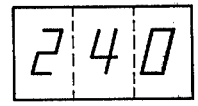
F I G. 10C

SPECTROPHOTOMETER

LIST OF PRIOR ART REFERENCES (37 CFR 1.56 (a))

The following references are cited to show the state of the art:

(1) Catalog entitled "Model 283 and Model 281 Infrared Spectrophotometers" published by Perkin Elmer Company in 1975

(2) "Handbook of Optical Techniques" pages 1014-1020, edited by Hiroshi Kubota, et al and published on July 10, 1969

BACKGROUND OF THE INVENTION

This invention relates to spectrophotometers, and more particularly to a spectrophotometer which is used for spectrophotometry according to an optical null method and the sensitivity of which can be easily adjusted.

A spectrophotometer based on the principle of an optical null method, or closed loop system is commonly used for the spectrophotometry in the infrared region. Samples subject to the measurement are enclosed in various sample cells having an infrared radiation transmission window, and it is therefore necessary to eliminate the spectroscopic property peculiar to each individual cell. A double-beam spectrophotometer is generally employed for this purpose. This double-beam spectrophotometer carries out the measurement according to such an optical null method which comprises dividing light emitted from an infrared light source into two light beams, passing one of the two light beams through a sample cell while passing the other light beam through a reference cell, and attenuating the light passed through the reference cell by means of a light attenuator until the amount of the light beam passed through the reference cell is reduced to the level to that passed through the sample cell, thereby maintaining always an optical balance of zero or null therebetween.

FIG. 1 is a block diagram of a prior art doublebeam spectrophotometer based on the optical null method. Referring to FIG. 1, light emitted from an infrared light source 10 is divided by a divider 11 into two light beams 12 and 14, and the light mean 12 is passed through a reference cell 16 and then through a variable light attenuator 18, while the light beam 14 is passed through a sample cell 20. These two light beams passed through the reference cell 16 and sample cell 20 respectively are then alternately supplied to a monochromater 24 by the action of a chopper 22 rotating at a constant period, and the light components of predetermined wavelength are extracted by the monochrometer 24 to be alternately supplied to a light detector 26. The monochrometer 24 is provided with a variable slit 28, and the slit width of this variable slit 28 is varied so as to adjust the intensity of the light components entering the light detector 26. Each of the light components entered the light detector 26 is subjected to photoelectric conversion therein, and the corresponding electrical output signal of the light detector 26 is applied to a synchronous rectifier 32 after being amplified by an amplifier 30 having a variable gain. A synchronizing signal generator 34 generates a synchronizing signal in synchronous relation with the light chopping operation of the chopper 22, and this synchronizing signal is applied to the synchronous rectifier 32 so that a DC signal of level proportional to the difference between the intensity of light passed through the reference cell 16 and that passed through the sample cell 20 appears at the output of the synchronous rectifier 32. This DC signal is applied through a servo amplifier 36 to a servomotor 38 to drive the same. The servomotor 38 is rotated to cause corresponding movement of the variable light attenuator 18 thereby adjusting the amount of the light beam 12 passed through the reference cell 16 so that the difference between the intensity of light passed through the reference cell 16 and that passed through the sample cell 20 can be automatically controlled to be zero or null.

Thus, in the balanced state of the system, the intensities of the two light beams entering the light detector 26 are equal to each other, and the rate of light transmission of the variable light attenuator 18 in that state is exactly equal to the transmissivity of the sample subjected to the measurement. In the balanced state of the system, therefore, the variable light attenuator 18 is moved to the position corresponding to the transmittance of the sample being measured, and the transmissivity of the sample can be indicated and recorded by a recording pen 40 operatively connected to the variable light attenuator 18.

In such a prior art spectrophotometer, there is a very great energy difference between the component of maximum energy and that of minimum energy in the energy distribution of the wavelengths of the light emitted from the infrared light source, and the reflection efficiency of the diffraction grating scanning the wave number varies over a very wide range depending on the wavelength of diffracted light. Further, due to the exchange of a plurality of optical filters having different transmission efficiencies, the light entering the light detector 26 has a widely varying energy level, the photoelectric conversion in the light detector 26 cannot be attained with the desired linearity. In order to obviate such a disadvantage and to ensure application of an optical signal of constant energy to the light detector 26, slit programming means has been employed in the prior art system so as to make programmed control of the slit width in such a relation that the slit width is varied to be inversely proportional to the energy distribution characteristic of the wavelengths of the light emitted from the light source and affected by optical elements thereby substantially flattening the energy characteristic of the optical input. According to this manner of slit width control, however, it is necessary to adjust the optical sensitivity in each cycle of measurement since the transmittance (reflectance) of various samples has various values, and the transmission (reflection) efficiency of various accessories used in the measurement has also various values.

For the purpose of sensitivity detection and adjustment in the prior art spectrophotometer based on the optical null method, a shutter 42 has been disposed in the path of the light beam 14 as shown in FIG. 1. This shutter 42 has been manually placed in and removed from the path of the light beam 14, and the overshoot resulting from the motion of the recording pen 40 due to the manipulation of the shutter 42 has been observed by the eyes of the operator to judge whether the sensitivity is adequate or not. The motion of the pen 40 due to the manipulation of the shutter 42 in the path of the light beam 14 is shown in FIGS. 2A to 2C. In the case of FIG. 2A, the overshoot S meets the standard, and the sensitivity is adequate. However, in the case of FIG. 2B, the overshoot S is excessively large, and the sensitivity is not adequate. In the case of FIG. 2C, there is utterly no overshoot, and the sensitivity is not adequate too. In a situation as shown in FIG. 2B or 2C, the sensitivity adjustment has been carried out by increasing or decreasing the amplification factor of the amplifier 30 to adjust the gain of the system, and then manipulating the shutter 42 again in the path of the light beam 14 to obtain the record by the pen 40 again, such operation being repeated until the characteristic shown in FIG. 2A is obtained. Such a manner of sensitivity adjustment has been tedious, time-consuming and troublesome.

FIG. 3 shows an improved sensitivity detecting means added to the prior art spectrophotometer shown in FIG. 1. Referring to FIG. 3, a DC signal source 44 generating a DC signal of predetermined voltage is connected through an electrical switch 46 to the spectrophotometer, and this switch 46 is closed at the time of sensitivity detection so as to apply the output voltage of the DC signal source 44 to the servo amplifier 36 in superposed relation with the voltage output of the synchronous rectifier 32. Due to the application of the DC voltage from the DC signal source 44, the balanced state of the system is now changed, and the variable light attenuator 18 is moved until the amount of light attenuated by the light attenuator 18 attains a level which cancels the applied DC voltage, thereby establishing a new balanced state of the system. In this case, the variable light attenuator 18 is moved to the position at which the light intensity difference corresponding to the DC voltage applied from the DC signal source 44 is produced between the two light beams. Thus, when the intensity of light directed for the purpose of measurement is high, the variable light attenuator 18 is moved over a short stroke, while when such is low, the variable light attenuator 18 is moved over a long stroke. Also, when the amplification factor of the amplifier 30 is large, the variable light attenuator 18 is moved over a short stroke, while when such is small, the variable light attenuator 18 is moved over a long stroke. This means that the motion of the variable light attenuator 18, hence, the recording pen 40 is inversely proportional to the light intensity and to the amplification factor of the amplifier 30. Therefore, the optimum sensitivity of the entire system can be provided by observing the variation in the motion of the recording pen 40 before and after the turning-on of the switch 46, and adjusting the optical sensitivity by adjusting the slit width of the variable slit 28 while, at the same time, adjusting the amplification factor of the amplifier 30 so as to provide the adequate variation in the motion of the recording pen 40. In such a prior art system, however, it has been difficult to adequately adjust the amplification factor of the amplifier 30 and the light intensity of the detection wavelength independently of each other since both of then affect the sensitivity of the entire system. Thus, the sensitivity adjustment in the prior art system shown in FIG. 3 has been carried out by repeatedly alternately adjusting the slit width of the variable slit 28 and the amplification factor of the amplifier 30 a plurality of times while repeatedly turning on and off the switch 46 until the waveform recorded by the pen 40 attains that shown in FIG. 2A.

SUMMARY OF THE INVENTION

It is a primary object of the present invention to provide a novel and improved spectrophotometer in which means are provided so that the optimum sensitivity can be easily provided in each cycle of measurement.

Other objects, features and advantages of the present invention will become more apparent from the following detailed description of preferred embodiments thereof taken in conjunction with the accompanying drawing.

BRIEF DESCRIPTION OF THE DRAWING

FIG. 4 is a block diagram showing the general system structure of a preferred embodiment of the spectrophotometer according to the present invention.

FIGS. 5A, 5B, 5C and 5D are signal waveform diagrams illustrating the operation of the system shown in FIG. 4.

FIGS. 6A, 6B, 6C, 6D and 6E are waveform diagrams of records obtained by the recording pen to illustrate how the sensitivity is adjusted in the system shown in FIG. 4.

FIG. 7 is a block diagram of an analog signal processing system in the spectrophotometer according to the present invention.

FIG. 8 is a block diagram of a digital signal processing system in the spectrophotometer according to the present invention.

FIGS. 10A, 10B and 10C show various states of display resultant to the processing by the signal processing system shown in FIG. 8.

DETAILED DESCRIPTION OF THE PREFERRED EMBODIMENTS

Figure 1:
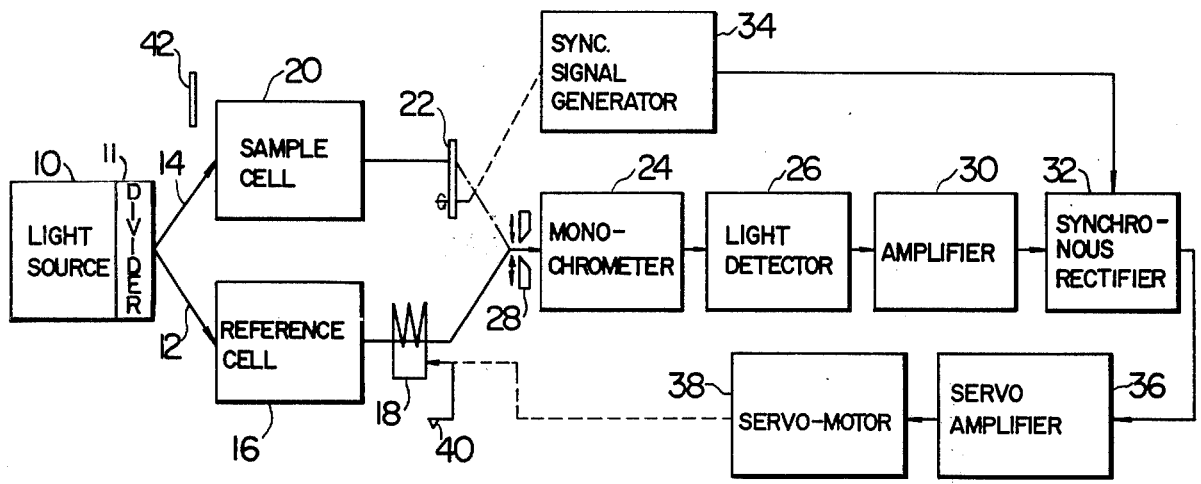
FIG. 1 is a block diagram showing the general system structure of a prior art spectrophotometer with which the present invention is associated.
Figure 2A:
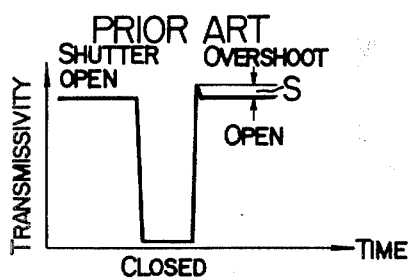
FIGS. 2A, 2B and 2C are recorded waveform diagrams illustrating the manner of sensitivity adjustment in the spectrophotometer shown in FIG. 1.
Figure 2B:
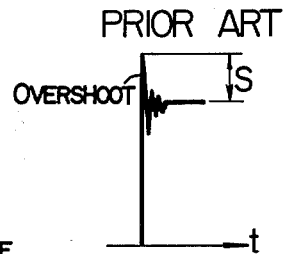
Figure 2C:
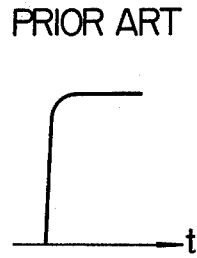
Figure 3:
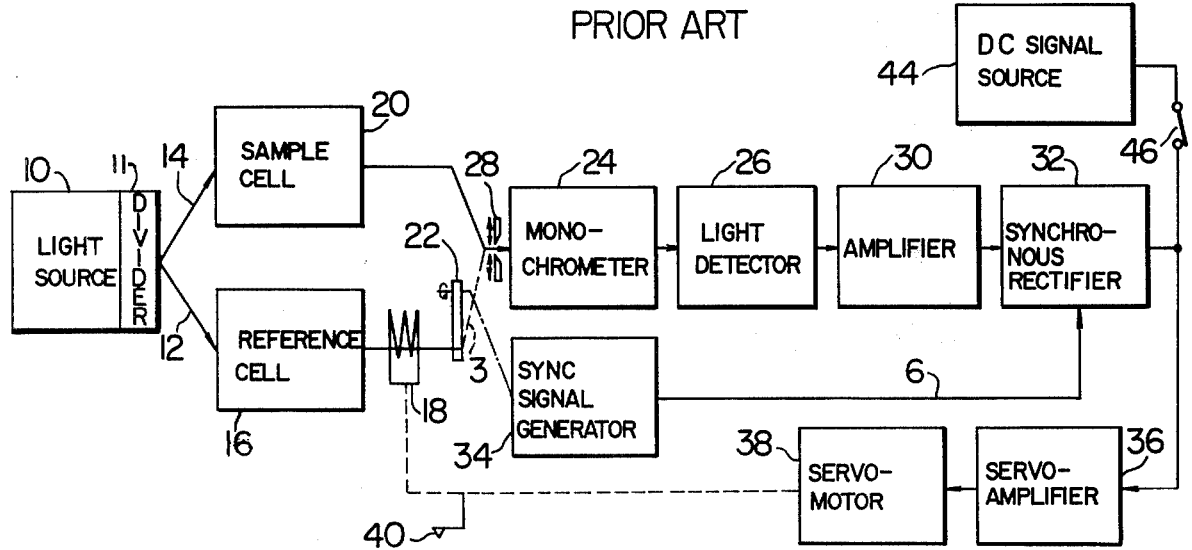
FIG. 3 is a block diagram showing the general system structure of another prior art spectrophotometer obtained by improving the spectrophotometer shown in FIG. 1.

FIG. 4 shows a preferred embodiment of the spectrophotometer according to the present invention. Referring to FIG. 4, light emitted from an infrared light source 10 is divided by a divider 11 into two light beams 12 and 14, and the light beam 12 is passed through a reference cell 16 and then through a variable light attenuator 18 to be supplied to a monochrometer 24, while the light beam 14 is passed through a sample cell 20 to be supplied to the monochrometer 24. These two light beams passed through the reference cell 16 and sample cell 20 respectively are alternately supplied to the monochrometer 24 by the action of a chopper 22 rotating at a constant period, and the light components of predetermined wavelength are extracted by the monochrometer 24 to be alternately supplied to a light detector 26. The monochrometer 24 is provided with a variable slit 28, and the slit width of this variable slit 28 is varied so as to adjust the intensity of the light components entering the light detector 26. Each of the light components entered the light detector 26 is subjected to photoelectric conversion therein, and the corresponding electrical output signal of the light detector 26 is applied to a synchronous rectifier 32 after being amplified by an amplifier 30 having a variable gain. A synchronizing signal generator 34 generates a synchronizing signal in synchronous relation with the light chopping operation of the chopper 22, and this synchronizing signal is applied to the synchronous rectifier 32 so that a DC signal of level proportional to difference between the intensity of light passed through the reference cell 16 and that passed through the sample cell 20 appears at the output of the synchronous rectifier 32. This DC signal is applied through a servo amplifier 36 to a servomotor 38 to drive the same. The servomotor 38 is rotated to cause corresponding movement of the variable light attenuator 18 thereby adjusting the amount of the light beam 12 passed through the reference cell 16 so that the difference between the intensity of light passed through the reference cell 16 and that passed through the sample cell 20 can be automatically controlled to be zero or null.

Thus, in the balanced state of the system, the intensities of the two light beams entering the light detector 26 are equal to each other, and the rate of light transmission of the variable light attenuator 18 in that state is exactly equal to the transmittance of the sample subjected to the measurement. In the balanced state of the system, therefore, the variable light attenuator 18 is moved to the position corresponding to the transmittance of the sample being measured, and the transmittance of the sample can be indicated and recorded by a recording pen 40 operatively connected to the variable light attenuator 18.

The general structure of the spectrophotometer based on the optical null method will be understood from the above description, and such a spectrophotometer is represented in FIG. 4 by a block 48 surrounded by the broken lines. The spectrophotometer according to the present invention comprises an AC signal source 50 as shown in FIG. 4. This AC signal source 50 generates an AC signal of rectangular waveform of predetermined amplitude in synchronous relation with the synchronizing signal applied from the synchronizing signal generator 34, and this AC signal is applied through a switch 52 to the input of the amplifier 30 in superposed relation with the output of the light detector 26. Thus, when the output signal of the light detector 26 appearing in response to the supply of the light passed through the sample cell 20 has a waveform as shown in FIG. 5A, and the output signal of the light detector 26 appearing in response to the supply of the light passed through the reference cell 16 has a waveform as shown in FIG. 5B, the variable light attenuator 18 is moved to the position at which these two signals have the same amplitude, thereby attaining a balance. In the balanced state of the system, the AC signal of rectangular waveform synchronous with the synchronizing signal as shown in FIG. 5C is applied from the AC signal source 50 to the input of the amplifier 30 through the switch 52. Consequently, the variable light attenuator 18 is moved to a new position so that the intensity difference which cancels the amplitude of the applied AC signal can be produced between the light passed through the sample cell 20 and that passed through the reference cell 16, thereby establishing a new balanced state of the system. In lieu of the rectangular waveform shown in FIG. 5C, the AC signal may have a sinusoidal waveform as shown in FIG. 5D. In either case, it is necessary to make the phase of the output signal of the light detector 26 to coincide with that of AC signal as shown in FIGS. 5A to 5D. If both the signals has not the same phase, not only the sensitivity is inaccurately detected but the motion of the variable light attenuator become unstable, so that the attenuator is made null function and produces noise. The frequency of the AC signal need not necessarily coincide with the period of rotation of the chopper 22, and they may have a relation of m:n where m/n is an integer.

The on-off of the switch 52 causes transient motion of the recording pen 40. The position of the pen 40 is converted into a voltage signal by a position-voltage transducer 54 which may be a potentiometer. This voltage signal is applied to a voltage difference detector 56 and to a voltage variation rate (dV/dt) detector 58. The voltage difference detector 56 detects the difference between the voltage output of the position-voltage transducer 54 in the balanced state of the system with the switch 52 turned off and the voltage output of the transducer 54 in the balanced state of the system with the switch 52 turned on. The voltage variation rate (dV/dt) detector 58 detects the rate of variation of the voltage output of the transducer 54 with respect to time when the switch 52 is turned on in the balanced state of the system with the switch 52 turned off.

An important fact to be especially noted in the system of the present invention above described is that the motion of light attenuator 18 or the pen 40 before and after the turning-on of the switch 52 is independent of an increase or decrease of the amplification factor of the amplifier 30. Thus, the motion of the pen 40 due to the on-off of the switch 52 is dependent solely upon the variation in the slit width of the variable slit 28 and is independent of the amplification factor of the amplifier 30. Therefore, the optical sensitivity of the system can be exclusively detected by observing the motion of the recording pen 40, that is, by reading the value displayed on the voltage difference detector 56. The rate of motion of the pen 40 with respect to time during the rising recording stroke of the pen 40 can be exclusively adjusted by adjusting the amplification factor of the amplifier 30. This rate of motion of the pen 40 with respect to time can be detected by reading the value indicated on the voltage variation rate (dV/dt) detector 58. This rate of motion of the pen 40 with respect to time represents the electrical gain since it is determined by the amplification factor of the amplifier 30.

FIGS. 6A to 6E show the motion of the recording pen 40 during the detection of the sensitivity. The solid lines in FIGS. 6A, 6B and 6C represent the motion of the recording pen 40 when the overall sensitivity of the system is adequate. Further, FIGS. 6B and 6C show that the optical sensitivity is excessively high and low respectively, whereas FIG. 6A shows that the optical sensitivity is adequate. A hunting as shown by the broken line in FIG. 6B will occur when the optical sensitivity alone is increased without adjusting the electrical gain of the amplifier 30 in the state shown in FIG. 6A. On the other hand, an insufficiently rising or dull waveform as shown by the broken line in FIG. 6C will result when the optical sensitivity alone is decreased without adjusting the electrical gain of the amplifier 30 in the state shown in FIG. 6A. Further, a quickly rising waveform with a hunting as shown in FIG. 6D will result when the electrical gain is selected to be high while maintaining the same optical sensitivity as that of FIG. 6A, and a slowly rising waveform as shown in FIG. 6E will result when the electrical gain is selected to be low while maintaining the same optical sensitivity as that of FIG. 6A. Therefore, the optimum sensitivity of the entire system can be provided by adjusting the slit width of the variable slit 28 to provide the optimum optical sensitivity and then adjusting the amplification factor of the amplifier 30 to provide the optimum electrical gain.

There is the following relation among the overall sensitivity, the optical sensitivity and the electrical gain:

$$\text{(overall sensitivity)} = \text{(optical sensitivity)} \times \text{(electrical gain)} \quad (1)$$

And, since the optical sensitivity and electrical gain can be detected by the voltage difference detector 56 and voltage variation rate (dV/dt) detector 58 respectively, the amplification factor can be sought from the detected optical sensitivity and electrical gain. When the spectrophotometer is provided with slit programming means, the suitability of the slit program can be judged on the basis of the indication of the voltage difference detector 56 for each wavelength so that the program can be properly corrected.

FIG. 7 shows a more detailed structure of the embodiment of the present invention and the spectrophotometer based on the optical null method shown surrounded by the broken lines in FIG. 4 is represented by the block 48 in FIG. 7. This form of the embodiment is adapted for processing the detected sensitivity signal in analog fashion. At the time of sensitivity detection, the AC signal of predetermined amplitude is applied from the AC signal source 50 to the input of the amplifier 30 in the spectrophotometer 48 through the switch 52. The position of the recording pen 40 is converted into a voltage signal by the position-voltage transducer 54 which may be a potentiometer. A switch 60 is arranged for interlocking operation with the switch 52 such that the switch 60 is turned on and off when the switch 52 is turned off and on respectively. Therefore, as soon as the switch 52 is turned on to permit application of the A AC signal from the AC signal source 50 to the input of the amplifier 30, the switch 60 is turned off, and the voltage value corresponding to the position of the pen 40 immediately before the turning-on of the switch 52 is held in a voltage holding circuit 62. A subtracting circuit 64 detects the difference between the output voltage of the position-voltage transducer 54 and the voltage held in the voltage holding circuit 62 and supplies the differential voltage to a comparator 66. The differential voltage becomes stable when the output voltage of the transducer 54 attains its steady level. In the comparator 66, the differential voltage is compared with a reference voltage supplied from a reference voltage source 68. This reference voltage has a level corresponding to the optimum optical sensitivity. The result of comparison by the comparator 66 is displayed on a display unit 70 to indicate whether the optical sensitivity is adequate or excessively high or excessively low.

The output of the position-voltage transducer 54 is also applied to a differentiating circuit 72 to be differentiated thereby, and the maximum or peak value of the output of the differentiating circuit 72 is held in a peak holding circuit 74. Therefore, the value held in the peak holding circuit 74 represents the maximum value of the rate of variation with respect to time of the output voltage of the transducer 54. However, this holding circuit 74 may be adapted to hold the voltage variation rate at a predetermined time after the turning-on of the switch 52. The value held in the peak holding circuit 74 is compared in a comparator 78 with a reference voltage supplied from a reference voltage source 76. This reference voltage has a level corresponding to the optimum electrical gain. The result of comparison by the comparator 78 is displayed on a display unit 80 to indicate whether the electrical gain is adequate or excessively high or excessively low.

Figure 9:
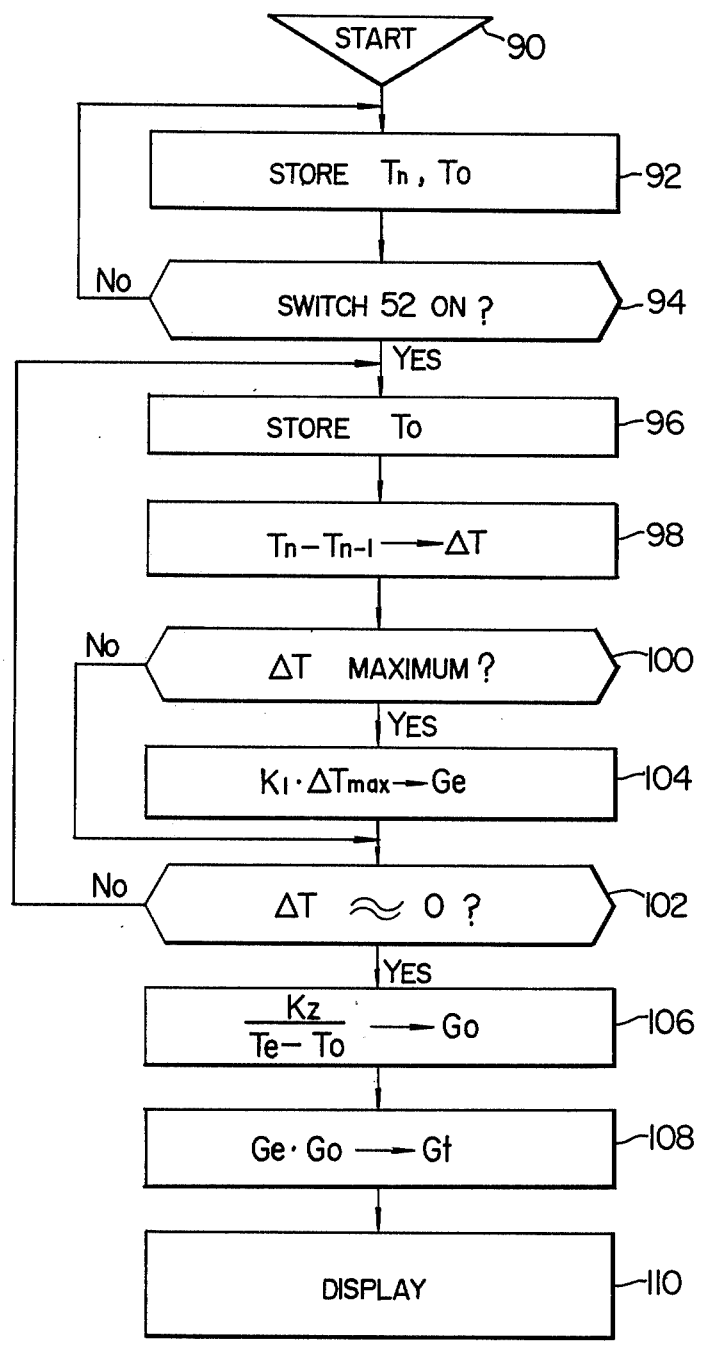
FIG. 9 is a flow chart showing the sequence of processing by the signal processing system shown in FIG. 8.

FIG. 8 shows another more detailed structure of the embodiment of the present invention, and the spectrophotometer based on the optical null method shown surrounded by the broken lines in FIG. 4 is represented by the block 48 in FIG. 8. This form of the embodiment is adapted for the optimum sensitivity detection by means of digital data processing. The position-voltage transducer 54 in FIG. 8 comprises a potentiometer 81 actuated by a shaft coupled movably to the pen drive shaft 82, and a DC power source 84 supplying a DC voltage to the potentiometer 81 so that the potentiometer 81 provides an output voltage proportional to the position of the pen 40. The output voltage of the potentiometer 81 is supplied to a processing and memory unit 88 after being subjected to A-D conversion in an A-D converter 86. This processing and memory unit 88 comprises a central processor, a read-only memory and a random access memory and operates according to a processing sequence as shown in FIG. 9. The output of the unit 88 is displayed on a display unit 112.

In the step 90 in FIG. 9, data processing starts with the turning-on of the power switch. In the step 92, the digital signal Tn applied from the A-D converter 86 is stored in the random access memory. The symbol To represents the data of the position of the pen 40 immediately before the turning-on of the switch 52. A step 94 judges whether the switch 52 is turned on or not. When the result of judgement in the step 94 is "NO", the operation is returned to the step 92 in which the data of the position of the pen are stored. When the result of check in the step 94 is "YES", the operation proceeds to a step 96 in which the data $T_o$ of the position of the pen immediately before the turning-on of the switch 52 is stored in another memory. In the step 98, the difference $\Delta T$ between the two consecutive data $T_n$ and $T_{n-1}$ is sought to be stored in the memory. The symbol $T_{n-1}$ represents the data stored just before the data $T_n$. Whether this difference $\Delta T$ is maximum or not is judged in the step 100. When the result of judgement in the step 100 is "NO", whether this difference $\Delta T$ is substantially zero or not is judged in the step 102. On the other hand, when the result of judgement in the step 100 is "YES", the maximum value $\Delta T_{max}$ is normalized in the step 104. Computation for the normalization is carried out according to the following formula:

$$\text{(displayed value of electrical gain } Ge) = \Delta T_{max} \times \text{(coefficient } K_1) \quad (2)$$

The above maximum value $\Delta T_{max}$ corresponds to the maximum value of the rate of motion with respect to time of the recording pen 40, and the coefficient $K_1$ is so selected that the display unit 112 displays "100" as shown in FIG. 10B when the electrical gain Ge is adequate. Therefore, the electrical gain is excessively small and large respectively when the display unit 112 displays values excessively smaller and larger than "100" as shown in FIGS. 10A and 10C.

The electrical gain Ge normalized according to the formula (2) is stored in the memory in the step 104. Thereafter, the steps 96, 98, 100 and 102 are repeated until $\Delta T$ is judged to be zero substantially in the step 102. When the result of judgement in the step 102 is "YES", computation for the normalization of the optical sensitivity is carried out in the step 106 according to the following formula:

(displayed value of optical sensitivity
$G_o) = $ (coefficient $K_2) \div (T_l - T_o)$ (3)

where $T_l$ is the last data stored in the memory at the time of attainment of the potentiometer output at its steady level after the turning-on of the switch 52. Due to the fact that the difference value $(T_l - T_o)$ is inversely proportional to the optical sensitivity, the coefficient $K_2$ is divided by the difference value $(T_l - T_o)$ so that the operator recognizes that the optical sensitivity should be increased and decreased respectively when the display unit 112 displays the values smaller and larger than "100" as shown in FIGS. 10A and 10C.

The optical sensitivity $G_o$ normalized according to the formula (3) in the step 106 is stored in the memory. In the step 108, the electrical gain $G_e$ and optical sensitivity $G_o$ are read out from the memory, and the overall sensitivity $G_t$ is computed according to the formula (1) to be stored in the memory. The electrical gain $G_e$, optical sensitivity $G_o$ and overall sensitivity $G_t$ obtained in the manner above described are selectively or individually displayed on the display unit 112 shown in FIG. 8.

We claim:

1. A spectrophotometer comprising:
   a light radiating source;
   an optical system dividing the light emitted from said light radiating source into two light beams to direct them toward a light detector through a sample cell and a reference cell respectively, said two light beams being passed through a monochrometer before entering said light detector;
   a variable slit for varying the intensity of light entering said light detector;
   a chopper acting to alternately introduce said two light beams into said light detector;
   an amplifier amplifying the output signal of said light detector, the electrical gain of said amplifier being adjustable;
   a synchronous rectifier operating in synchronous relation with the operation of said chopper for the synchronous rectification of the output signal of said amplifier thereby providing an output signal proportional to the intensity difference between said two light beams;
   a variable light attenuator for attenuating one of said two light beams;
   a servo mechanism moving said variable light attenuator in one direction or the other until the output of said synchronous rectifier becomes null;
   an AC signal source generating an AC signal in synchronous relation with the operation of said chopper and applying said AC signal to the input of said amplifier;
   position-voltage transducing means generating a position signal representing the position of said variable light attenuator;
   voltage difference detecting means detecting the difference between the voltage values of said position signal before and after the application of said AC signal from said AC signal source to the input of said amplifier; and
   voltage variation rate detecting means detecting the rate of transient variation with respect to time of said position signal after the application of said AC signal from said AC signal source to the input of said amplifier,
   whereby the optical sensitivity of said spectrophotometer is detected by said voltage difference detecting means, and the electrical gain is detected by said voltage variation rate detecting means.

2. A spectrophotometer as claimed in claim 1, wherein said voltage difference detecting means comprises a memory circuit storing the voltage value of said position signal before the application of said AC signal, a subtracting circuit detecting the difference between the voltage value stored in said memory circuit and the voltage value of said position signal after the application of said AC signal, a comparator comparing the output of said subtracting circuit with a reference voltage, and a display unit displaying the result of comparison by said comparator to indicate that the optical sensitivity is low, excessive or adequate.

3. A spectrophotometer as claimed in claim 1, wherein said voltage variation rate detecting means comprises a differentiating circuit detecting the rate of transient variation with respect to time of said position signal after the application of said AC signal, a comparator comparing the output of said differentiating circuit with a reference voltage, and a display unit displaying the result of comparison by said comparator to indicate that the electrical gain is low, excessive or adequate.

4. A spectrophotometer as claimed in claim 1, wherein said position-voltage transducing means and said voltage difference detecting means comprise a position-digital converter converting the position of said variable light attenuator into a digital signal, a processing and memory unit storing the successive values of the digital signal applied from said position-digital converter, and a display unit displaying the digital signal output of said processing and memory unit, said processing and memory unit computing the difference between the values of said digital signal applied before and after the application of said AC signal thereby providing the digital signal output representing the optical sensitivity.

5. A spectrophotometer as claimed in claim 1, wherein said position-voltage transducing means and said voltage variation rate detecting means comprises a position-digital converter converting the position of said variable light attenuator into a digital signal, a processing and memory unit storing the successive values of the digital signal applied from said position-digital converter, and a display unit displaying the digital signal output of said processing and memory unit, said processing and memory unit computing the difference between the values of said digital signal applied after the application of said AC signal thereby providing the digital signal output representing the electrical gain.

6. A spectrophotometer as claimed in claim 4, wherein said processing and memory unit carries out necessary computation to normalize the optical sensitivity to apply the digital signals representing the normalized optical sensitivity to said display unit.

7. A spectrophotometer as claimed in claim 5, wherein said processing and memory unit carries out necessary computation to normalize the electrical gain to apply the digital signals representing the normalized electrical gain to said display unit.

* * * * *